US012630909B2

(12) United States Patent (10) Patent No.: US 12,630,909 B2
Lu et al. (45) Date of Patent: May 19, 2026

(54) FERRITIC STAINLESS STEEL USED FOR BIPOLAR PLATES OF FUEL CELLS, CONTROLLING METHOD OF SURFACE ROUGHNESS, METHOD OF FORMING PASSIVATION FILMS, AND USE

(71) Applicants: SHANDONG INDUSTRIAL RESEARCH INSTITUTE OF ADVANCED MATERIALS CO., LTD, Jinan (CN); STATE POWER INVESTMENT CORPORATION HYDROGEN ENERGY CO., LTD., Beijing (CN)

(72) Inventors: Huaxing Lu, Beijing (CN); Yeting Xi, Beijing (CN); Yunmin Yang, Shandong (CN); Jian Wei, Shandong (CN)

(73) Assignee: SHANDONG INDUSTRIAL RESEARCH INSTITUTE OF ADVANCED MATERIALS CO., LTD, Jinan (CN)

( * ) Notice: Subject to any disclaimer, the term of this patent is extended or adjusted under 35 U.S.C. 154(b) by 783 days.

(21) Appl. No.: 17/758,881

(22) PCT Filed: Mar. 21, 2022

(86) PCT No.: PCT/CN2022/081922
§ 371 (c)(1),
(2) Date: Jul. 15, 2022

(87) PCT Pub. No.: WO2023/155264
PCT Pub. Date: Aug. 24, 2023

(65) Prior Publication Data
US 2024/0301539 A1 Sep. 12, 2024

(30) Foreign Application Priority Data
Feb. 21, 2022 (CN) .......................... 202210155650.8

(51) Int. Cl.
| | |
|---|---|
| *C22C 38/44* | (2006.01) |
| *C22C 38/02* | (2006.01) |
| *C22C 38/42* | (2006.01) |
| *C22C 38/48* | (2006.01) |
| *C22C 38/50* | (2006.01) |
| *C25D 11/34* | (2006.01) |
| *C25D 21/12* | (2006.01) |
| *H01M 8/021* | (2016.01) |

(52) U.S. Cl.
CPC ............. *C22C 38/44* (2013.01); *C22C 38/02* (2013.01); *C22C 38/42* (2013.01); *C22C 38/48* (2013.01); *C22C 38/50* (2013.01); *C25D 11/34* (2013.01); *C25D 21/12* (2013.01); *H01M 8/021* (2013.01)

(58) Field of Classification Search
CPC ...................................................... C22C 38/44
See application file for complete search history.

(56) References Cited

U.S. PATENT DOCUMENTS

| | | | |
|---|---|---|---|
| 4,264,356 A | 4/1981 | Shinagawa | |
| 5,779,820 A | 7/1998 | Hauser et al. | |
| 8,278,009 B2 | 10/2012 | Ishikawa et al. | |
| 2009/0004040 A1* | 1/2009 | Kato ...................... C22C 38/26 | |
| | | | 420/39 |
| 2014/0023550 A1 | 1/2014 | Hadama | |
| 2015/0275342 A1 | 10/2015 | Ishii | |
| 2020/0248332 A1 | 8/2020 | Yano | |

FOREIGN PATENT DOCUMENTS

| | | |
|---|---|---|
| CA | 3168212 A1 | 9/2021 |
| CN | 102260775 | 11/2011 |
| CN | 102268713 | 12/2011 |
| CN | 102272343 | 12/2011 |
| CN | 102272343 A | 12/2011 |
| CN | 101768702 B | 5/2012 |
| CN | 102471916 | 5/2012 |
| CN | 102925950 | 2/2013 |
| CN | 103154292 A | 6/2013 |
| CN | 104746123 | 7/2015 |
| CN | 106917129 | 7/2017 |
| CN | 108368612 | 8/2018 |
| CN | 108368612 A | 8/2018 |

(Continued)

OTHER PUBLICATIONS

Supplemental Partial European Search Report for EP 22 72 9406 (May 29, 204) (14 pages).
Notice of Reason for Refusal for JP 2022-540711 (Apr. 23, 2024) (7 pages).
Canada OA for CA3,165,412 (Apr. 23, 2025).
CN Search Report for CN2022112759154 (Feb. 24, 2025).
CN Office Action for CN2022112759154 (Feb. 28, 2025).
KR Office Action for KR 10-20227024855 (2024).
Fu Yu et al., Research of Metal Bipolar Plates with Surface Treatment for Proton Exchange Membrane Fuel Cell, Journal of Xian Jiaotong University (2008).
First Search of CN 202210155650.8.
First OA of CN 202210155650.8.

(Continued)

*Primary Examiner* — Christopher S Kessler

(57) ABSTRACT

Provided are a ferritic stainless steel used for bipolar plates of fuel cells, a controlling method of surface roughness, a method of forming passivation films, and use. The ferritic stainless steel comprises C of less than or equal to 0.03 wt. %, N of less than or equal to 0.02 wt. %, Si of less than or equal to 0.4 wt. %, Mn of less than or equal to 0.5 wt. %, Cr of 16-23 wt. %, Cu of 0-2.0 wt. %, Mo of 1.8-2.5 wt. %, Ni of 0.2-2.0 wt. %, Ti of 0.1-0.5 wt. %, Nb of 0.005-0.5 wt. %, P of less than or equal to 0.02 wt. %, S of less than or equal to 0.02 wt. %, and a remainder composed of Fe and other unavoidable accompanying elements, and the ferritic stainless steel has a grain size number of 4-9. The ferritic stainless steel has excellent corrosion resistance and electrical conductivity, and good elongation and deformation as well, exhibiting both economy and cost advantages.

8 Claims, 5 Drawing Sheets

(56) References Cited

FOREIGN PATENT DOCUMENTS

| | | | |
|---|---|---|---|
| CN | 111057947 | A | 4/2020 |
| CN | 111519229 | | 8/2020 |
| CN | 111519229 | A | 8/2020 |
| DE | 3221087 | | 12/1983 |
| JP | 2000328205 | | 11/2000 |
| JP | 3809827 | B2 | 8/2006 |
| JP | 4976727 | | 7/2012 |
| JP | 2012201950 | A | 10/2012 |
| JP | 2012201951 | | 10/2012 |
| JP | 5682901 | B2 | 3/2015 |
| JP | 2019070187 | | 5/2019 |
| JP | 2019070187 | A | 5/2019 |
| JP | 2021004384 | | 1/2021 |
| JP | 2021004384 | A | 1/2021 |
| JP | 6926923 | B2 | 8/2021 |
| KR | 20100074512 | A | 7/2010 |
| KR | 101729037 | | 4/2017 |
| KR | 101742088 | | 6/2017 |
| WO | 2020/127275 | | 6/2020 |
| WO | 2021/182266 | A1 | 9/2021 |

OTHER PUBLICATIONS

Ouyang Chun, Influence of different pH on the electrochemical and passivity behaviour of HNSS bipolar plates for PEMFCs, Journal of Jiangsu University of Science and Technology ( Natural Science Edition), vol. 35 No. 6, Dec. 2021, pp. 94-99.
ISR for PCT/CN2022/018922 (Nov. 24, 2022).

* cited by examiner

FERRITIC STAINLESS STEEL USED FOR BIPOLAR PLATES OF FUEL CELLS, CONTROLLING METHOD OF SURFACE ROUGHNESS, METHOD OF FORMING PASSIVATION FILMS, AND USE

TECHNICAL FIELD

Embodiments of the present application relate to the technical field of stainless steel production, and for example, relate to a ferritic stainless steel used for bipolar plates of fuel cells, a controlling method of surface roughness, a method of forming passivation films, and use.

BACKGROUND

A fuel cell is a device that directly converts the chemical energy of fuel into electrical energy, and a proton exchange membrane fuel cell (PEMFC) is one type of fuel cell. Due to the high power generation efficiency and non-polluting to the environment. PEMFC has attracted worldwide attention and developed rapidly up to now. As a core component of the fuel cell, the bipolar plate plays an important role in supporting the membrane electrode in the fuel cell, separating hydrogen and oxygen, collecting electrons, conducting heat, providing hydrogen and oxygen channels, discharging the water generated from the reaction, providing coolant flow passages, etc. With the increasing requirements for high volumetric power density of fuel cells, the metal bipolar plate are applied more widely, because the material of the metal bipolar plate has high strength and toughness, allowing to be made into thin bipolar plates by stamping.

However, the metal bipolar plate has poor corrosion resistance and high interface contact resistance in the hydrogen fuel cell environment, which has always been a difficult problem. The industry urgently needs a metal material with strong corrosion resistance, good electrical conductivity and low cost to match the large-scale demand brought about by the rapid development of the industry. In 2017, Korean scholars disclosed a stainless steel having excellent contact resistance for a polymer fuel cell separator and a method for manufacturing the stainless steel (KR: 013918/2017; CN: 110199047B/2017), and the stainless steel products have been used in the production of modern fuel cell vehicles, and its electrical conductivity and corrosion resistance meet the standards set by the U.S. Department of Energy. In 2010, Japanese scholars disclosed a stainless steel for a fuel cell having good corrosion resistance and a method for producing the same for JFE (CN: 102471916/2010; JP: 062739/2010), and the related materials will be applied on fuel cell buses.

With the rapid development of the industry in recent years, the requirements for product consistency have increased. The main problem related to the preparation scheme of ferritic stainless steel bipolar plates is the poor deformation ability caused by the composition design, which causes a tough challenge in the forming process of the polar plate, and the deformation of the bipolar plate can also lead to problems such as poor sealing. At the same time, there exists the cost problem caused by numerous alloying elements. On the other hand, the passivation film on the stainless steel surface is an important corrosion-resistant functional layer, but its preparation process causes the formed passivation film to be thin and discontinuous, resulting in poor corrosion resistance, uncontrollable growth and composition of the passivation film, and resulting in unstable electrical conductivity and corrosion resistance. In addition, the common materials of metal bipolar plates include titanium besides stainless steel. However, as a bipolar plate material, titanium has relatively poor deformation, more difficulty in stamping, and a much higher cost than stainless steel, which affects the polar plate on key issues such as consistency, corrosion resistance and economy. There are problems need to be solved urgently.

SUMMARY

The following is a summary of the subject specifically described in the present disclosure. This summary is not intended to limit the protection scope of the claims.

The present application provides a ferritic stainless steel used for bipolar plates of fuel cells, a controlling method of surface roughness, a method of forming passivation films, and use.

In a first aspect, an embodiment of the present application provides a ferritic stainless steel used for bipolar plates of fuel cells, in which based on that a mass of the ferritic stainless steel is 100%, the ferritic stainless steel includes:

| | |
|---|---|
| C | less than or equal to 0.03 wt. %; |
| N | less than or equal to 0.02 wt. %; |
| Si | less than or equal to 0.4 wt. %; |
| Mn | less than or equal to 0.5 wt. %; |
| Cr | 16-23 wt. %; |
| Cu | 0-2.0 wt. %; |
| Mo | 1.8-2.5 wt. %; |
| Ni | 0.2-2.0 wt. %; |
| Ti | 0.1-0.5 wt. %; |
| Nb | 0.005-0.5 wt. %; |
| P | less than or equal to 0.02 wt. %; |
| S | less than or equal to 0.02 wt. %; and | a remainder composed of Fe and other unavoidable accompanying elements; in the unavoidable accompanying impurities, preferably, O is less than or equal to 0.02 wt. %, and Sn is less than or equal to 0.1%;

the ferritic stainless steel has a grain size number of 4-9, such as 4, 5, 6, 7 or 8, and preferably 6-8. Accordingly, it can be ensured that the stainless steel material has appropriate manufacturability (facilitating rolling, heat treatment and other processes), and certain economy while conducive to the processing and forming of bipolar plate materials.

C has the effect of solid solution strengthening, which has a very low solubility in ferrite, and the excess carbon is precipitated in the form of carbides, and meanwhile, C will form Cr carbonitrides with Cr, which will also cause chromium depletion at grain boundaries and intergranular corrosion for the ferritic stainless steel, affecting the mechanical and welding properties of the material. In the ferritic stainless steel of the present application, a content of C is less than or equal to 0.03 wt. %, such as 0.03 wt. %, 0.02 wt. % or 0.01 wt. %, and preferably, the content of C is less than or equal to 0.02 wt. %.

N will form Cr carbonitrides with Cr, resulting in a Cr depletion region and reducing the corrosion resistance of stainless steel. In the ferritic stainless steel of the present application, a content of N is less than or equal to 0.02 wt. %, such as 0.02 wt. % or 0.01 wt. %.

Si is an element useful for deoxidation. However, as the content increases, the processability of the material decreases. In the ferritic stainless steel of the present application, a content of Si is less than or equal to 0.4 wt. %, such as 0.4 wt. %, 0.35 wt. %, 0.3 wt. %, 0.25 wt. %, 0.2 wt. %, 0.15 wt. %, 0.1 wt. %, 0.08 wt. %, 0.05 wt. % or 0.03 wt. %.

Mn is an unavoidably accompanying element in steel, which has some deoxidation effect and also improves the strength of steel. However, the impurity MnS is prone to becoming a corrosion starting point and reduces the corrosion resistance. In the ferritic stainless steel of the present application, the content of Mn is less than or equal to 0.5 wt. %, such as 0.5 wt. %, 0.47 wt. %, 0.45 wt. %, 0.4 wt. %, 0.35 wt. %, 0.3 wt. %, 0.25 wt. %, 0.2 wt. %, 0.15 wt. %, 0.1 wt. %, 0.08 wt. %, 0.05 wt. % or 0.03 wt. %.

Cr is a fundamental element that determines the corrosion resistance of ferritic stainless steel. Chromium reacts with oxygen in the corrosive medium and forms a thin oxide film on the steel surface, which can prevent the steel substrate from being corroded further. However, the increase of chromium content will accelerate the formation and precipitation of α and σ phases, thus reducing the toughness and significantly increasing the brittle transition temperature, which is not conducive to the processing for manufacturing stainless steel. In the ferritic stainless steel of the present application, a content of Cr is 16-23 wt. %, such as 16 wt. %, 16.5 wt. %, 16.8 wt. %, 17 wt. %, 17.5 wt. %, 18 wt. %, 18.5 wt. %.%, 19 wt. %, 19.5 wt. %, 20 wt. %, 20.5 wt. %, 21 wt. %, 21.5 wt. %, 22 wt. %, 22.5 wt. % or 23 wt. %.

Cu is an element that improves the corrosion resistance of stainless steel, and also improves the cold workability of the material. In the ferritic stainless steel of the present application, a content of Cu is 0-2.0 wt. %, such as 0 wt. %, 0.05 wt. %, 0.1 wt. %, 0.2 wt. %, 0.25 wt. %, 0.3 wt. %, 0.35 wt. %, 0.4 wt. %, 0.5 wt. %, 0.55 wt. %, 0.6 wt. %, 0.7 wt. %, 0.8 wt. %, 1 wt. %, 1.2 wt. %, 1.3 wt. %, 1.4 wt. %, 1.6 wt. %, 1.8 wt. % or 2 wt. %.

Mo is another major element for improving the corrosion resistance of stainless steel. Mo facilitates the passivation of Fe—Cr alloy, and improves the corrosion resistance of steel in reducing medium, especially the resistance to localized corrosion in chloride solution, such as pitting corrosion and crevice corrosion. However, when Mo has a high content, the ferrite σ phase and other brittle phases are prone to appear, resulting in a reduced toughness and increased strength for the steel, which is not conducive to processing materials. In the ferritic stainless steel of the present application, a content of Mo is 1.8-2.5 wt. %, such as 1.8 wt. %, 1.85 wt. %, 1.9 wt. %, 2.0 wt. %, 2.1 wt. %, 2.2 wt. %, 2.3 wt. %, 2.4 wt. % or 2.5 wt. %.

Ni is an element that improves the corrosion resistance of stainless steel, and meanwhile, plays a role in reducing the contact resistance. In the ferritic stainless steel of the present application, a content of Ni is 0.2-2.0 wt. %, such as 0.2 wt. %, 0.3 wt. %, 0.4 wt. %, 0.5 wt. %, 0.6 wt. %, 0.8 wt. %, 1.0 wt. %, 1.1 wt. %, 1.3 wt. %, 1.4 wt. %, 1.5 wt. %, 1.7 wt. %, 1.8 wt. % or 2.0 wt. %.

Ti and Nb both preferentially combine with C and N to form carbonitrides, thereby suppressing corrosion resistance reduction due to precipitation of Cr carbonitrides. However, if the content is too high, the processability will decrease. In the ferritic stainless steel of the present application, a content of Ti is 0.1-0.5 wt. %, such as 0.1 wt. %, 0.2 wt. %, 0.3 wt. %, 0.4 wt. % or 0.5 wt. %. In the ferritic stainless steel of the present application, a content of Nb is 0.005-0.5 wt. %, such as 0.1 wt. %, 0.2 wt. %, 0.3 wt. %, 0.4 wt. % or 0.5 wt. %, and Nb is preferably 0.1-0.4 wt. %.

In the ferritic stainless steel of the present application, a content of P is less than or equal to 0.02 wt. %, such as 0.02 wt. % or 0.01 wt. %.

In the ferritic stainless steel of the present application, a content of S is less than or equal to 0.02 wt. %, such as 0.02 wt. % or 0.01 wt. %, preferably less than or equal to 0.01 wt. %.

In addition to the above, for the purpose of improving corrosion resistance, V of 0-1 wt. % and/or W of 0-1 wt. % may be each included. In order to realize the effect, the two elements both preferably have a content of more than or equal to 0.1 wt. %.

As a preferred technical solution of the present application, V and W will combine with C in preference to Cr to improve the corrosion resistance of the material, and have a synergistic effect with Nb to a certain extent; at the same time, in order to maintain the suitable material processing property, the addition amount of Nb should be appropriately reduced when V and W are added.

For the purpose of improving hot workability, a rare earth metal of 0.0002-1 wt. % may also be included, preferably Ce or Y. In order to realize the effect, the rare earth metal of more than or equal to 0.0005 wt. % is preferably included.

The ferritic stainless steel of the present application has the characteristics of few alloying element types and low Cr content. By designing the types and contents of each element, excellent corrosion resistance, electrical conductivity, and good elongation and deformation ability are obtained. At the same time, both economy and cost advantages are obtained. In the steel, a content of Ni is preferably 0.9-1.2 wt. %, which further reduces the cost and still satisfies the above effects.

Compared with other metal materials of bipolar plates (such as titanium bipolar plates), the ferritic stainless steel of the present application has the advantages of low cost and better formability and processability.

Preferably, a surface roughness of the ferritic stainless steel is within 100-700 nm, such as 100 nm, 150 nm, 170 nm, 200 nm, 230 nm, 260 nm, 300 nm, 325 nm, 350 nm, 380 nm, 400 nm, 435 nm, 460 nm or 500 nm. When the roughness is too small, the interface contact resistance will increase significantly, the internal resistance of fuel cell will increase and the ferritic stainless steel will not fit well with the gas diffusion layer, thus it is not suitable for the application; when the roughness is too large, although the contact resistance is low, the corrosion resistant of the material will reduce significantly, failing to satisfy the requirements of the bipolar plate inside the fuel cell or in the acidic environment. Preferably, the surface roughness is 100-600 nm, and further preferably, 200-500 nm.

As a preferred technical solution of the ferritic stainless steel provided in the present application, a passivation film is provided on the surface of the ferritic stainless steel, and the passivation film includes a p-type passivation film and an n-type passivation film. As an important functional layer for corrosion resistant and electrical conductivity, the passivation film has advantages in performance. Its technical mechanism is as follows: the p-type passivation film can effectively prevent the solution from contacting with the substrate and thus prevent corrosion occurs; the n-type passivation film can effectively prevent metal ions dissolving out, thereby effectively reducing the adverse effects of metal ions on other core components of fuel cells (such as proton exchange membranes and catalysts), and improving the performance and life of fuel cell stacks.

In the present application, the p-type passivation film corresponds to a p-type semiconductor region, and the n-type passivation film corresponds to an n-type semiconductor region.

In the present application, the p-type passivation film refers to a p-type semiconductor passivation film, and the n-type passivation film refers to an n-type semiconductor passivation film.

In the present application, the positional relationship between the p-type passivation film and the n-type passivation film is not specifically limited, for example, an inner layer may be an n-type passivation film and an outer layer may be a p-type passivation film. The inner layer refers to the side of the passivation film close to the stainless steel main material, and the outer layer refers to the side close to the solution.

Preferably, a molar ratio of chromium hydroxide to chromium oxide in the p-type passivation film is represented as $I_p[Cr(OH)_3/Cr_2O_3]$, and $I_p[Cr(OH)_3/Cr_2O_3]$ is at least 10, such as 10, 11, 12, 13, 14, 15, 16, 17, 18, 20, 23 or 25, preferably at least 15. By optimizing the molar ratio of chromium hydroxide to chromium oxide in the p-type passivation film, excellent corrosion resistance can be obtained, and the higher the ratio, the higher the hydroxide ratio and the better the corrosion resistance.

Preferably, a molar ratio of chromium hydroxide to chromium oxide in the n-type passivation film is represented as $I_n[Cr(OH)_3/Cr_2O_3]$, and $I_n[Cr(OH)_3/Cr_2O_3]$ is at most 10, such as 10, 9, 8, 7, 6, 5, 4, 3, 2, 1 or 0.5, preferably less than 5. By optimizing the molar ratio of chromium hydroxide to chromium oxide in the n-type passivation film, excellent electrical conductivity can be obtained, and the lower the ratio, the higher the oxide ratio and the better the electrical conductivity.

Preferably, $I_p[Cr(OH)_3/Cr_2O_3]/I_n[Cr(OH)_3/Cr_2O_3]$ is more than 3, and preferably, $I_p[Cr(OH)_3/Cr_2O_3]/I_n[Cr(OH)_3/Cr_2O_3]$ is more than or equal to 4, such as 3.5, 4, 5, 6, 7, 8, 9 or 10. If $I_p[Cr(OH)_3/Cr_2O_3]/I_n[Cr(OH)_3/Cr_2O_3]$ is less than or equal to 3, the overall performance of the passivation film cannot be guaranteed.

In the present application, $I_p[Cr(OH)_3/Cr_2O_3]/I_n[Cr(OH)_3/Cr_2O_3]$ is abbreviated as $I_p/I_n$.

Preferably, a thickness of the passivation film is 5-20 nm, such as 5 nm, 6 nm, 8 nm, 10 nm, 12 nm, 13 nm, 15 nm, 16 nm, 18 nm, 19 nm or 20 nm, preferably 10-15 nm. If the passivation film is too thin (less than 5 nm), the corrosion resistance will be poor, and if the passivation film is too thick (more than 20 nm), the electrical conductivity will be poor. In the preferred thickness range of 10-15 nm, the good corrosion resistance and electrical conductivity can be both better guaranteed.

Preferably, a thickness of the p-type passivation film is represented as $t_p$, a thickness of the n-type passivation film is represented as $t_n$, and $t_p/t_n$ is more than 0.2 but less than 0.6, such as 0.25, 0.3, 0.35, 0.4, 0.45, 0.5 or 0.55. Under this condition, the excellent interfacial contact resistance can be better guaranteed.

Preferably, in the passivation film, the inner layer is the n-type passivation film, the outer layer is the p-type passivation film, and $t_p/t_n$ is more than 0.2 but less than 0.6.

In this preferred technical solution, the passivation film structure has the n-type inner layer (better electrical conductivity) and the p-type outer layer (better corrosion resistance), and the p-type passivation film is thinner and the n-type passivation film is thicker. Such structure determines that the passivation film has both good corrosion resistance and electrical conductivity.

In a second aspect, an embodiment of the present application provides a controlling method of surface roughness for a stainless steel, and the controlling method includes:

taking a main material of stainless steel, and subjecting the main material of stainless steel to electrolysis in an acid solution, in which during the electrolysis, a polarization voltage satisfies the following formula (I):

$$E \geq \lg D + 12 + pH. \tag{I}$$

In the formula, E is the polarization voltage with a unit of V, D is a grain size of the main material of stainless steel with a unit of micron, and pH is a pH value of the initial acid solution.

The controlling method of the present application uses an electrolysis method to control the surface roughness of the stainless steel main material, which has the advantages of controllable surface roughness, and can realize a pertinent control of the stainless steel surface roughness according to the characteristics of membrane electrodes and gas diffusion in proton exchange membrane fuel cells. The controlling method facilitates the bipolar plate bonding to related components well, thereby reducing the contact resistance of the battery system, which is more suitable for industrial application characteristics.

In the method of the present application, if E does not satisfy formula (I), there may be no significant change in roughness, and the optimal roughness cannot be realized to match the gas diffusion layer, thereby adversely affecting the performance of the fuel cell stack.

The controlling method may use the ferritic stainless steel according to the first aspect as a substrate. The controlling method can also use other stainless steel materials in the art as a substrate.

The above "use the ferritic stainless steel described in the first aspect as a substrate" refers to that the main material of stainless steel (eg, stainless steel plate) is made of the ferritic stainless steel according to the first aspect, for example, by smelting, hot rolling and cold rolling.

Preferably, the polarization voltage is 5-15 V, such as 5 V, 6 V, 8 V, 9 V, 10 V, 12 V, 13 V or 15 V.

Preferably, a time of the electrolysis is 10-300 s, such as 10 s, 15 s, 20 s, 25 s, 30 s, 35 s, 40 s, 45 s, 50 s, 60 s, 65 s, 70 s, 75 s, 80 s, 85 s, 90 s, 100 s, 120 s, 130 s, 140 s, 150 s, 160 s, 170 s, 180 s, 200 s, 220 s, 230 s, 240 s, 260 s, 280 s or 300 s, preferably 20-120 s.

Preferably, a temperature of the electrolysis is 25-70° C., such as 25° C., 27° C., 30° C., 35° C., 40° C., 45° C., 50° C., 55° C., 60° C., 65° C. or 70° C., preferably 25-40° C.

Preferably, the acid solution used during the electrolysis is sulfuric acid, or a mixed acid solution of sulfuric acid and hydrohalic acid. The time of roughness preparation can be shortened and the roughness can be appropriately increased by the coupling between sulfuric acid and hydrohalic acid.

In the present application, hydrohalic acid is abbreviated as HX acid, in which X is halogen, such as F, Cl, Br or I.

Preferably, the hydrohalic acid is at least one of hydrofluoric acid, hydrochloric acid, hydrobromic acid and hydroiodic acid, preferably hydrochloric acid and/or hydrofluoric acid.

Preferably, a concentration of the sulfuric acid is 0.1-14 mol/L, such as 0.1 mol/L, 0.3 mol/L, 0.5 mol/L, 0.8 mol/L, 1 mol/L, 1.5 mol/L, 1.7 mol/L, 2 mol/L, 2.2 mol/L, 2.5 mol/L, 2.8 mol/L, 3 mol/L, 3.5 mol/L, 3.8 mol/L, 4 mol/L, 4.5 mol/L, 5 mol/L, 5.5 mol/L, 6 mol/L, 6.5 mol/L, 7 mol/L, 7.5 mol/L, 8 mol/L, 8.5 mol/L, 9 mol/L, 9.5 mol/L, 10 mol/L, 11 mol/L, 12 mol/L, 13 mol/L or 14 mol/L, preferably 0.1-7 mol/L.

Preferably, in the mixed acid solution of sulfuric acid and hydrohalic acid, a concentration of hydrohalic acid is 0-3 mol/L but not including 0, such as 0.05 mol/L, 0.1 mol/L, 0.2 mol/L, 0.25 mol/L, 0.3 mol/L, 0.4 mol/L, 0.5 mol/L, 0.7 mol/L, 1 mol/L, 1.5 mol/L, 1.7 mol/L, 1.9 mol/L, 2 mol/L, 2.2 mol/L, 2.4 mol/L, 2.5 mol/L, 2.8 mol/L or 3 mol/L, preferably at most 0.5 mol/L.

In a third aspect, embodiments of the present application provide a method of forming passivation films on stainless steel surface, in which an electrochemical passivation method is used to prepare a passivation film, including the following steps:

> providing a main material of stainless steel, using a three-electrode system, placing the main material of stainless steel, a counter electrode and a reference electrode into an electrochemical passivation solution, and performing potentiostatic polarization, forming a passivation film on the surface of the main material of stainless steel.

In the three-electrode system, the main material of stainless steel is the sample to be treated, and the other two electrodes are the counter electrode and the reference electrode. Generally, the reference electrode is between the sample to be treated and the counter electrode.

In the present application, the passivation film is formed on the stainless steel surface by electrochemical passivation, and the obtained passivation film has excellent performances. The passivation film is compact, has good continuity, and achieves the purpose that corrosion resistance is enhanced and contact resistance is reduced. Moreover, the passivation solution is environmentally friendly for the selection and method, and can ensure excellent contact resistance under ultra-low concentration or hydrofluoric acid-free conditions (meeting the US DOE standard).

The electrochemical passivation method of the present application can realize the control of the composition, structure and thickness of the passivation film, and the control of the passivation film can be realized by the electrochemical passivation process based on the design of specific material composition.

In the method of forming passivation films on the surface of stainless steel, the main material of stainless steel referred to may be based on the ferritic stainless steel according to the first aspect, or may be based on the stainless steel with roughness adjusted according to the second aspect, or may be based on other stainless steel materials in the art.

In the present application, the preparation method of the stainless steel main material is the prior art, and those skilled in the art can prepare it with reference to the relevant technology, and exemplarily but non-restrictively, the main material can be prepared according to the method described below.

An ingot is prepared according to the composition of the ferritic stainless steel of the first aspect, the ingot is subjected to cogging for a certain thickness (such as 80-120 mm) to obtain a stainless steel plate, and then is hot-rolled, in which the heating and holding temperature is 1150-1200° C., the holding time is 1.5-2 h, the primary rolling temperature is controlled at 1100-1150° C., 8-10 subsequent rolling processes are carried out for a certain thickness (such as 2-3 nm), and the ultimate rolling temperature is controlled more than or equal to 800° C.

An annealing treatment is carried out after hot rolling, in which the annealing temperature is 950-1050° C., and the holding time depends on the size of hot rolled coil, and a pickling treatment is carried out after hot rolling. The steel is subjected to 8-10 cold rolling for a required thickness, and then subjected to a continuous annealing treatment for 1-3 min.

The method of the present application can ensure excellent corrosion resistance and electrical conductivity by preparing a controllable roughness on the stainless steel surface and then forming a passivation film.

Preferably, the electrochemical passivation solution is a nitric acid solution with a concentration of 0.05-10 mol/L, such as 0.5 mol/L, 1 mol/L, 1.5 mol/L, 2 mol/L, 2.5 mol/L, 3 mol/L, 3.5 mol/L, 4 mol/L, 4.5 mol/L, 5 mol/L, 5.5 mol/L, 6 mol/L, 6.5 mol/L, 7 mol/L, 7.5 mol/L, 8 mol/L, 8.5 mol/L, 9 mol/L or 10 mol/L, and preferably, the concentration of the nitric acid solution is 1.5-5 mol/L.

Preferably, a temperature of the electrochemical passivation is 20-85° C., such as 20° C., 25° C., 30° C., 33° C., 35° C., 38° C., 40° C., 45° C., 50° C., 55° C., 60° C., 65° C., 70° C., 75° C., 80° C. or 85° C., preferably 35-65° C.

Preferably, an anode potential of the electrochemical passivation is at least 0.45 V, such as 0.5 V, 0.6 V, 0.7 V, 0.8 V, 0.9 V, 1.0 V, 1.1 V, 1.2 V, 1.3 V or 1.4 V, preferably 0.8-1.2 V.

Preferably, a time of the electrochemical passivation is 5-120 min, such as 5 min, 10 min, 15 min, 20 min, 25 min, 30 min, 35 min, 40 min, 45 min, 50 min, 55 min, 60 min, 65 min, 70 min, 80 min, 90 min, 100 min, 110 min or 120 min, preferably 50-90 min.

In a fourth aspect, embodiments of the present application provide use of the ferritic stainless steel according to the first aspect, in which the ferritic stainless steel is used for bipolar plates of fuel cells.

Compared with the related art, the present application has the beneficial effects described below.

> (1) The ferritic stainless steel in embodiments of the present application has the characteristics of few alloying element types and low Cr content. By designing the types and contents of each element, excellent corrosion resistance, electrical conductivity, and good elongation and deformation ability are obtained. At the same time, both economy and cost advantages are obtained. In the steel, the content of Ni can be as low as 0.2-0.5, which further reduces the cost and still satisfies the above effects.
>
> (2) The controlling method in embodiments of the present application uses an electrolysis method to control the surface roughness of the stainless steel main material, which has the advantages of controllable surface roughness, and can realize a pertinent control of the stainless steel surface roughness according to the characteristics of membrane electrodes and gas diffusion in proton exchange membrane fuel cells. The controlling method facilitates the bipolar plate bonding to related components well, thereby reducing the contact resistance of the battery system, which is more suitable for industrial application characteristics.
>
> (3) The passivation film is formed on the stainless steel surface by electrochemical passivation in embodiments of the present application, and the obtained passivation film has excellent performances. The passivation film is compact, has good continuity, and achieves the purpose that corrosion resistance is enhanced and contact resistance is reduced. Moreover, the passivation solution is environmentally friendly for the selection and method, and can ensure excellent contact resistance under ultra-low concentration or hydrofluoric acid-free conditions (meeting the US DOE standard).

After reading and understanding the drawings and detailed description, other aspects can be understood.

BRIEF DESCRIPTION OF DRAWINGS

The drawings are used to provide a further understanding of the technical solutions of the present disclosure, constitute a part of the description, explain the technical solutions of the present disclosure in conjunction with the embodiments of the present application, and do not limit the technical solutions of the present disclosure.

DETAILED DESCRIPTION

Figure 1:
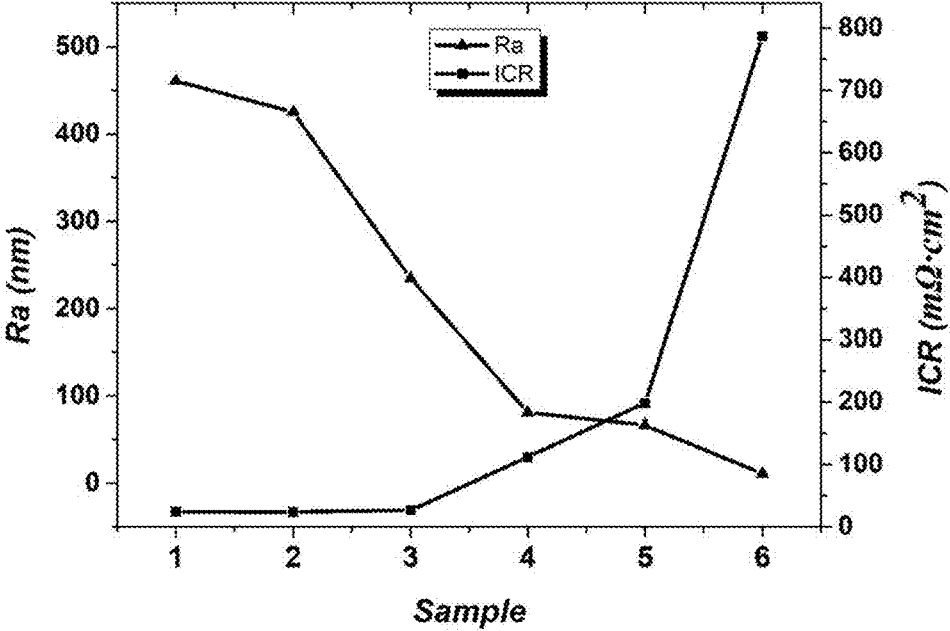
FIG. 1 is a graph showing the relationship between stainless steel roughness and interface contact resistance in an example of the present application, in which Samples 1-6 correspond to Examples 16-21 in sequence respectively.

Technical solutions of the present disclosure are further described below with reference to the accompanying drawings and through specific embodiments.

Table 1 shows the chemical composition of materials (mass percentage, wt. %) used in steelmaking.

tance to localized corrosion in chloride solution, such as pitting corrosion and crevice corrosion. However, when Mo has a high content, the ferrite σ phase and other brittle phases are prone to appear, resulting in a reduced toughness and increased strength for the steel, which is not conducive to processing materials.

C has the effect of solid solution strengthening. Its solubility in ferrite is very low, and the excess carbon is precipitated in the form of carbides, which will also cause chromium depletion at grain boundaries and intergranular corrosion for the ferritic stainless steel, affecting the mechanical and welding properties of the material.

Si is an element useful for deoxidation. However, as the content increases, the processability of the material decreases.

Mn is an unavoidably accompanying element in steel, which has some deoxidation effect and also improves the strength of steel. However, the impurity MnS is prone to becoming a corrosion starting point and reduces the corrosion resistance.

N and C will form Cr carbonitrides with Cr, resulting in a Cr depletion region and reducing the corrosion resistance of stainless steel.

Ti and Nb both preferentially combine with C and N to form carbonitrides, thereby suppressing corrosion resistance reduction due to precipitation of Cr carbonitrides. However, if the content is too high, the processability will decrease.

Cu is an element that improves the corrosion resistance of stainless steel, and also improves the cold workability of the material.

Ni is an element that improves the corrosion resistance of stainless steel, and meanwhile, plays a role in reducing the contact resistance.

TABLE 1

| Steel | Chemical Composition of Materials (wt. %) | | | | | | | | | | | |
| No. | C | Mn | Si | Ni | Cr | Mo | Ti | Nb | Cu | Ce | V | W |
| 1 | 0.0017 | 0.21 | 0.032 | 0.29 | 17.05 | 1.94 | 0.235 | 0.117 | 0.44 | — | — | — |
| 2 | 0.002 | 0.28 | 0.091 | 1.05 | 17.27 | 1.99 | 0.211 | 0.168 | 0.81 | — | — | — |
| 3 | 0.003 | 0.27 | 0.127 | 1.02 | 17.87 | 1.86 | 0.156 | 0.131 | 0.66 | 0.001 | — | — |
| 4 | 0.021 | 0.13 | 0.107 | 1.04 | 17.85 | 1.88 | 0.152 | 0.108 | 0.63 | — | — | — |
| 5 | 0.011 | 0.082 | 0.134 | 0.56 | 17.58 | 1.86 | 0.059 | 0.005 | 0.78 | — | 0.11 | 0.14 |
| 6 | 0.03 | 0.42 | 0.069 | 0.501 | 17.48 | 1.03 | 0.16 | 0.105 | 0.32 | — | — | — |
| 7 | 0.02 | 0.306 | 0.079 | 1.93 | 17.09 | 2.51 | 0.16 | 0.112 | 0.33 | — | — | — |
| 8 | 0.008 | 0.228 | 0.070 | 0.272 | 22.72 | 1.98 | 0.24 | 0.128 | 0.74 | — | — | — |
| 9 | 0.007 | 0.049 | 0.011 | 1.02 | 19.14 | 1.54 | 0.218 | 0.127 | 0.49 | — | — | — |
| 10 | 0.008 | 0.051 | 0.012 | 1.03 | 21.16 | 1.48 | 0.224 | 0.125 | 0.39 | — | — | — |

The functions of each element in ferritic stainless steel are described below.

Cr is a fundamental element that determines the corrosion resistance of ferritic stainless steel. Chromium reacts with oxygen in the corrosive medium and forms a thin oxide film on the steel surface, which can prevent the steel substrate from being corroded further. However, the increase of chromium content will accelerate the formation and precipitation of α and σ phases, thus reducing the toughness and significantly increasing the brittle transition temperature, which is not conducive to the processing for manufacturing stainless steel.

Mo is another major element for improving the corrosion resistance of stainless steel. Mo facilitates the passivation of Fe—Cr alloy, and improves the corrosion resistance of steel in reducing medium, especially the resis- A remainder is composed of Fe and the unavoidable impurities.

In addition to the above, for the purpose of improving corrosion resistance, V of 0-1 wt. % and/or W of 0-1 wt. % may be each included. In order to realize the effect, the two elements both preferably have a content of more than or equal to 0.1 wt. %.

For the purpose of improving hot workability, a rare earth metal of 0.0002-1 wt. % may also be included, preferably Ce or Y. In order to realize the effect, the rare earth metal of more than or equal to 0.0005 wt. % is preferably included.

Examples 1-21

Ingots were prepared according to the ferritic stainless steels of different steel numbers shown in Table 1, in which the corresponding relationship in each example between the ingots and the ferritic stainless steels of different steel numbers is shown in Table 2. The ingots were subjected to cogging for 100 mm to obtain a stainless steel plate, and then were hot-rolled, in which the heating and holding temperature was 1200° C., the holding time was 2 h, the primary rolling temperature was controlled at 1100° C., eight subsequent rolling processes were carried out for 3 mm, and the ultimate rolling temperature was controlled at 800° C. An annealing treatment was carried out after hot rolling, in which the annealing temperature was 1050° C., and the holding time depended on the size of hot rolled coil, and a pickling treatment was carried out after hot rolling. Then, the steel was taken out and cooled in the air, then subjected to cold rolling to give a foil with the required thickness, and then subjected to an annealing treatment at 950° C. for 2 min, so as to obtain the final foil sample, namely, the stainless steel material.

For the stainless steel material in Example 1, the elongation after fracture at room temperature was tested according to GB/T 228.1-2010. The sample was prepared into a sheet shape according to the tensile standard and tested, and it was obtained that the sample has an elongation after fracture of 33.5%.

The above-mentioned stainless steel materials were subjected to surface roughness treatment sequentially, and the materials were prepared into diverse surface roughness. The specific treatment method included that: the concentrated sulfuric acid and deionized water were used to prepare a sulfuric acid solution, and the above-mentioned stainless steel materials were finally processed into samples whose length and width were both 20 mm and put into sulfuric acid solution for surface roughness treatment with different parameters. The roughness preparation conditions are shown in Table 2.

TABLE 2

| | | Roughness Preparation Conditions | | | | |
|---|---|---|---|---|---|---|
| Example | Steel No. | Sulfuric Acid Concentration mol/L | Hydrofluoric Acid Concentration mol/L | Temperature ° C. | Voltage V | Time s |
| 1 | 1 | 3 | 0 | 25 | 10 | 60 |
| 2 | 2 | 3 | 0.5 | 25 | 10 | 60 |
| 3 | 2 | 5 | 0 | 25 | 10 | 60 |
| 4 | 2 | 0.05 | 0 | 25 | 10 | 60 |
| 5 | 2 | 15 | 0 | 25 | 10 | 60 |
| 6 | 3 | 3 | 0 | 60 | 10 | 60 |
| 7 | 3 | 3 | 0.2 | 40 | 10 | 60 |
| 8 | 3 | 3 | 0 | 80 | 10 | 60 |
| 9 | 3 | 3 | 0 | 10 | 10 | 60 |
| 10 | 4 | 3 | 0 | 25 | 15 | 60 |
| 11 | 4 | 3 | 0 | 25 | 20 | 60 |
| 12 | 4 | 3 | 0 | 25 | 15 | 200 |
| 13 | 4 | 3 | 0 | 25 | 10 | 400 |
| 14 | 5 | 3 | 0 | 25 | 5 | 100 |
| 15 | 5 | 3 | 0 | 25 | 3 | 100 |
| 16 | 1 | 5 | 0 | 65 | 10 | 300 |
| 17 | 1 | 5 | 0 | 65 | 10 | 200 |
| 18 | 1 | 5 | 0 | 65 | 8 | 120 |
| 19 | 1 | 15 | 0 | 65 | 6 | 40 |
| 20 | 1 | 15 | 0 | 65 | 6 | 120 |
| 21 | 1 | 15 | 0 | 65 | 6 | 240 |

After the stainless steel materials in Examples 16-21 were subjected to roughness treatment, the samples were taken, the material surface was cleaned with acetone and dried by nitrogen blowing, the stainless steel was subjected to surface roughness test using a surface profiler and recorded, and an interface contact resistance value of the material at 150 N/cm² was tested and recorded using an interfacial contact resistance measuring instrument. The results are shown in Table 3 and FIG. 1.

TABLE 3

| | Example | | | | | |
|---|---|---|---|---|---|---|
| | 16 | 17 | 18 | 19 | 20 | 21 |
| Roughness (Ra/nm) | 460.9 | 425.3 | 234.6 | 81 | 66.5 | 10.9 |
| Interface Contact Resistance (ICR/m$\Omega \cdot$ cm²) | 24.1 | 23.7 | 26.75 | 112.1 | 198.8 | 786.7 |

It is found in Table 3 and FIG. 1 that within a certain range of surface roughness, the stainless steel material had low interfacial contact resistance, and the material could be used in fuel cells after proper optimization. The preferred roughness was within between 100-700 nm, further preferably 200-500 nm. Materials outside the preferred range had higher interface contact resistance (Examples 19, 20 and 21), and had more difficulty in applying to fuel cells. When the roughness was too small, the interface contact resistance would increase significantly, the internal resistance of the fuel cell would increase, and additionally, a good adherence could not be realized between the material and a gas diffusion layer, so the material was not suitable for application; when the roughness was too large, although the contact resistance was low, the corrosion resistant of the material would reduce significantly, failing to satisfy the requirements of the bipolar plate inside the fuel cell or in the acidic environment. After the roughness treatment described above (Examples 16-21 had been tested for surface roughness and interfacial contact resistance), the steel sheets in Examples 1-21 were subsequently subjected to electrochemical passivation treatment, and the specific treatment method was that:

the obtained steel sheets were subjected to electrochemical passivation with an anode potential of 1.1 V for 1 h in a 1.6 mol/L HNO; solution at 40° C.

After the electrochemical passivation treatment described above, the samples were rinsed with deionized water and dried by cold nitrogen blowing, and placed in a dry environment (air) at room temperature for 24 h. Then the samples were tested, specifically including the following steps.

(1) The $t_p/t_n$ and $I_p/I_n$ were ascertained according to the following methods, and the results are shown in Table 4.

(I) The passivation film was subjected to depth profiling and narrow energy scanning with X-ray photoelectron spectroscopy (XPS), in which the X-ray source was Al K$\alpha$ micro-focused monochromator, CAE scanning mode was used for scanning, and the narrow energy scanning had a pass energy of 30-50 eV and a step size of 0.05-0.1 eV; argon ion etching was used for depth profiling, and each etching depth was 1 nm, 1 nm, 1 nm, 1 nm, 2 nm, 2 nm, 2 nm, 2 nm, 5 nm and 5 nm, respectively.

(II) The measured results were processed using software, and the peak area corresponding to each phase was used to express its content. Due to that the stainless steel passivation film was basically composed of hydroxides and oxides of Fe and Cr, the XPS test was mainly used to analyze the contents of Fe phase, Cr phase, and the hydroxides and oxides thereof in the passivation film. When the passivation film had a higher content of hydroxides of Fe and Cr than a content of oxides of Fe and Cr, the passivation film was determined to be a p-type semiconductor passivation film; when the passivation film had a lower content of hydroxides of Fe and Cr than a content of oxides of Fe and Cr, the passivation film was determined to be an n-type semiconductor passivation film. Based on the above, the thickness $t_p$ of the p-type semiconductor and the thickness $t_n$ of the n-type semiconductor in the passivation film, and the ratio of chromium hydroxide to chromium oxide in the p-type passivation film and the n-type passivation film can be determined, so as to obtain $t_p/t_n$ and $I_p/I_n$.

Figure 2:
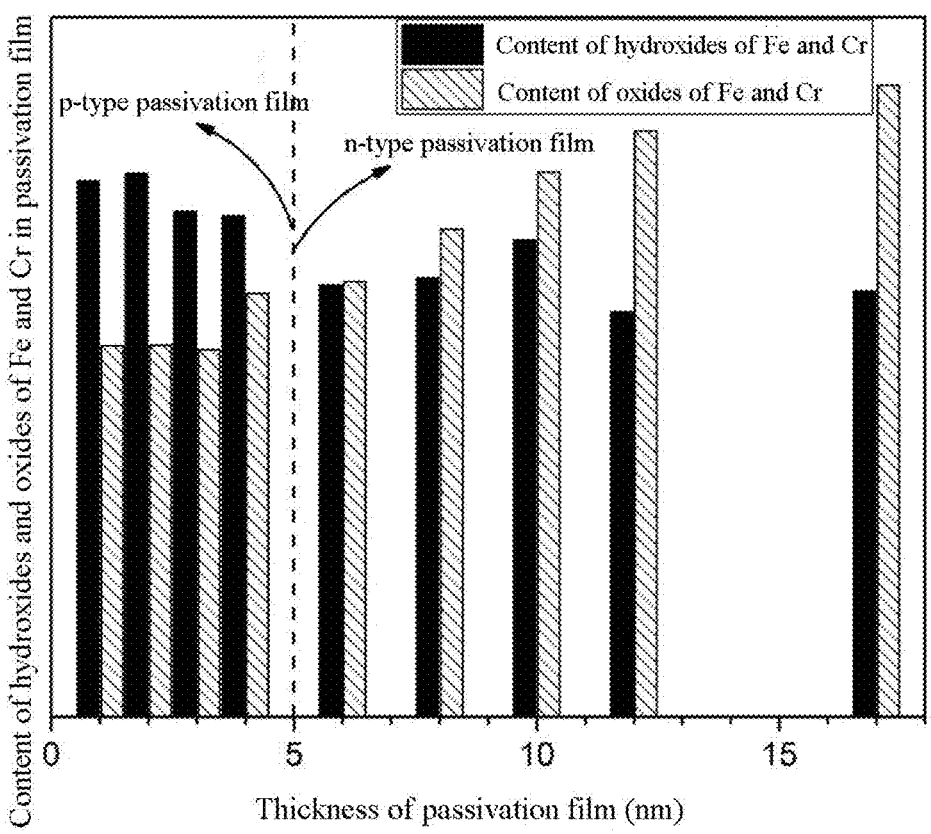
FIG. 2 and FIG. 3 are XPS spectra of passivation films of a stainless steel in an example of the present application.
Figure 3:
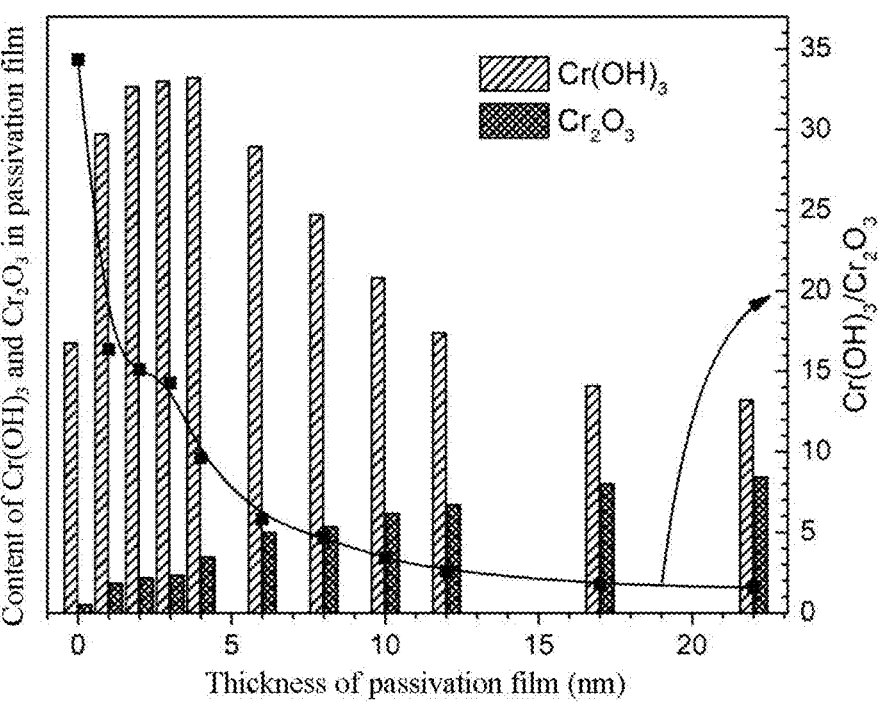

FIG. 2 and FIG. 3 are XPS spectra of passivation films of the stainless steel in Example 1. FIG. 2 shows the content of hydroxides and oxides of Fe and Cr in the passivation film. As can be seen from the figure, the thickness of the p-type semiconductor passivation film was about 5 nm, while the thickness of the n-type semiconductor passivation film was within 10-15 nm. The ratio $t_p/t_n$ of the two passivation film thicknesses was in the range of 0.33-0.56, and the corrected $t_p/t_n$ was 0.55. In FIG. 3, the bars represent the content of hydroxides and oxides of Cr in different thickness regions of the passivation film, respectively, and the curve represents the corresponding ratio of hydroxides and oxides. In conjunction with FIG. 2, it can be seen that in the p-type passivation film, the ratio of hydroxides to oxides was more than or equal to 10, mostly more than or equal to 15 (taking 15 as the average value); the ratio of hydroxides to oxides of Cr in the n-type passivation film was about 2-5, mostly 2-3 (taking 2.5 as the average value). Therefore, it could be judged that $I_p/I_n$ was 7.

(2) Performing service performance test under simulated working environment of the fuel cell: a 300 h endurance test was carried out, in which the temperature was 80° C., pH of the sulfuric acid solution was 3, and the potential was 0.84 V (vs. SHE), and the corrosion current density value was recorded and the interface contact resistance value at 150 N/cm$^2$ was measured on the material surface, and the results are shown in Table 4.

TABLE 4

| Example | $t_p/t_n$ | $I_p/I_n$ | Interface Contact Resistance mΩ · cm$^2$ | Corrosion Current Density μA · cm$^{-2}$ |
|---|---|---|---|---|
| 1 | 0.55 | 7 | 4.5 | 0.3 |
| 2 | 0.45 | 4.5 | 3 | 1.0 |
| 3 | 0.56 | 6.2 | 5 | 2.1 |
| 4 | 0.77 | 2.2 | 78 | 25 |
| 5 | 0.67 | 2.3 | 55 | 7.7 |
| 6 | 0.55 | 4.7 | 8 | 1.5 |
| 7 | 0.44 | 4.5 | 5 | 0.5 |
| 8 | 0.35 | 2.2 | 50 | 12.0 |
| 9 | 0.62 | 2.2 | 77 | 11 |
| 10 | 0.33 | 6.5 | 7.2 | 1.6 |
| 11 | 0.72 | 1.2 | 45 | 17 |
| 12 | 0.60 | 5.1 | 6.5 | 1.1 |
| 13 | 0.88 | 2.1 | 89 | 6 |
| 14 | 0.56 | 6.6 | 7.8 | 0.7 |
| 15 | 0.61 | 2.2 | 98 | 4.5 |
| 16 | 0.45 | 7.5 | 7.0 | 2.1 |
| 17 | 0.32 | 6.2 | 5.8 | 1.3 |

TABLE 4-continued

| Example | $t_p/t_n$ | $I_p/I_n$ | Interface Contact Resistance mΩ · cm$^2$ | Corrosion Current Density μA · cm$^{-2}$ |
|---|---|---|---|---|
| 18 | 0.49 | 5.6 | 6.7 | 1.3 |
| 19 | 0.12 | 3.4 | 162.8 | 1.1 |
| 20 | 0.11 | 4.5 | 276.2 | 0.6 |
| 21 | 0.14 | 3.7 | 867.6 | 0.5 |

It can be found form Table 4 that by performing roughness treatment and electrochemical passivation treatment simultaneously, the surface passivation film, which had a contact resistance of less than or equal to 8 mΩ·cm$^2$, a thickness ratio of the p-type and n-type semiconductors within 0.2-0.6, and $I_p[Cr(OH)_3/Cr_2O_3]/I_n[Cr(OH)_3/Cr_2O_3]$ of more than 4, was obtained, in which the current density was less than 3 μA·cm$^{-2}$, and the interface contact resistance was less than 8 mΩ·cm$^2$, indicating that the passivation film had excellent protection capability and conductivity.

At the same time, it can be seen from Table 4 that on the basis of the same electrochemical passivation treatment conditions, the surface state of stainless steel could be changed by changing the roughness preparation conditions, thereby finally improving the performance of the prepared passivation film.

It can be found from Examples 2-3 that for the roughness preparation conditions, the concentration of hydrohalic acid in the range of 0-3 mol/L was conducive to increasing $I_p/I_n$, keeping $t_p/t_n$ in a suitable range, and reducing the interface contact resistance and corrosion current density.

It can be found from Examples 2-5 that for the roughness preparation conditions, the concentration of sulfuric acid in the range of 0.1-7 mol/L was conducive to increasing $I_p/I_n$, keeping $t_p/t_n$ in a suitable range, and reducing the interface contact resistance and corrosion current density.

It can be found from Examples 6-9 that for the roughness preparation conditions, the temperature of electrolysis in the range of 25-70° C. was conducive to increasing $I_p/I_n$, and reducing the interface contact resistance and corrosion current density.

By comparing Example 10 with Example 11 and comparing Example 14 and Example 15, it can be found that for the roughness preparation conditions, the polarization voltage in the range of 5-15 V was conducive to increasing $I_p/I_n$, keeping $t_p/t_n$ in a suitable range, and reducing the interface contact resistance and corrosion current density.

By comprehensively analyzing Examples 10-13, the reason for performance degradation of the passivation film in Example 13 was possibly that the electrolysis time was too long for the roughness preparation conditions, resulting in the poor thickness ratio and composition of p-type and n-type passivation films.

Examples 22-30

These examples differ from Example 1 in that the electrochemical passivation treatment was performed with different parameters. The same method of Example 1 was used for analyzing and evaluating. The electrochemical passivation conditions and the test results of Example 1 and Examples 22-30 are shown in Table 5.

TABLE 5

| | Electrochemical Passivation Conditions | | | | | | Interface | Corrosion |
|---|---|---|---|---|---|---|---|---|
| Example | Nitric Acid Concentration mol/L | Temperature ° C. | Voltage V | Time min | $t_p/t_n$ | $I_p/I_n$ | Contact Resistance $m\Omega \cdot cm^2$ | Current Density $\mu A \cdot cm^{-2}$ |
| 1 | 1.6 | 40 | 1.1 | 60 | 0.55 | 7 | 4.5 | 0.3 |
| 22 | 15 | 40 | 1.1 | 60 | 0.1 | 2.2 | 78 | 25 |
| 23 | 4.6 | 40 | 1.1 | 60 | 0.32 | 4.3 | 7 | 1.5 |
| 24 | 1.6 | 90 | 1.1 | 60 | 0.77 | 2.1 | 150 | 4.3 |
| 25 | 1.6 | 40 | 0.8 | 60 | 0.45 | 4.4 | 7.7 | 1.2 |
| 26 | 1.6 | 40 | 0.3 | 60 | 0.13 | 1.5 | 123 | 7 |
| 27 | 1.6 | 40 | 1.1 | 30 | 0.34 | 5.2 | 8 | 2.1 |
| 28 | 1.6 | 40 | 1.1 | 240 | 0.78 | 1.2 | 150 | 4.5 |
| 29 | 1.6 | 40 | 0.6 | 60 | 0.33 | 3.5 | 7.9 | 3.0 |
| 30 | / | / | / | / | / | / | 178.4 | 37.2 |

Note:

Example 30 in Table 5 was a bare sample, and that is, no electrochemical passivation is performed on the basis of Example 1.

It can be found from Table 5 that by adjusting the condition parameter of electrochemical passivation, such as nitric acid concentration, temperature, potential and passivation time, to the prescribed range, the performance of the passivation film could be further improved. And it can be found from the test results of the stainless steel sample of Example 1 after serving in the fuel cell environment for a period of time that the passivation film could not only reduce the interface contact resistance of the stainless steel to less than or equal to 8 $m\Omega \cdot cm^2$, but also keep the corrosion current density of the stainless steel at a low level, and the stainless steel exhibited good corrosion resistance and electrical conductivity.

The Mott-Schottky (M-S) curve test was performed on Example 1, Example 25, Example 29 and Example 30 to determine the carrier concentration of the passivation film, estimating the effect of electrochemical passivation treatment and voltage on the passivation film performance.

The specific test method of the M-S curve is described below.

Samples were subjected to the M-S curve test in a sulfuric acid solution with pH=3 at 80° C. In order to increase the conductivity of the sulfuric acid solution, 0.1 mol/L of $Na_2SO_4$ was added to the solution. An electrochemical workstation was used in the M-S curve test, the test range was –1-1 V, and the test step size was 25 mV/step. The slope of straight line segment of the p-type passivation film and the n-type passivation film were obtained by fitting, and then the carrier concentration corresponding to the p-type or n-type was calculated according to the M-S model, and the passivation film performance was determined by the carrier concentration.

Figure 4:
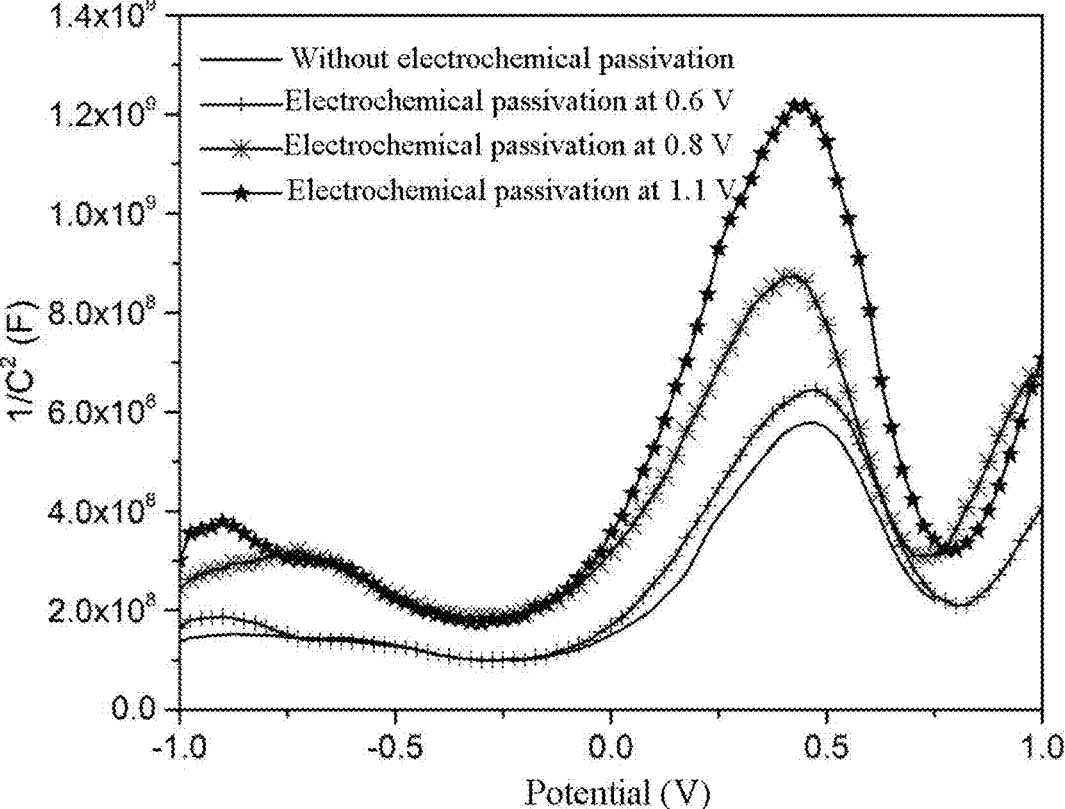
FIG. 4 is a diagram showing M-S curves of passivation films of a stainless steel in an example of the present application.

FIG. 4 is a diagram showing M-S curves of passivation films of the stainless steels in Example 1 (electrochemical passivation potential of 1.1 V), Example 25 (electrochemical passivation potential of 0.8 V). Example 29 (electrochemical passivation potential of 0.6 V) and Example 30 (no electrochemical passivation performed). It can be found from FIG. 4 that the p-type semiconductor region was not obvious for the sample without electrochemical passivation, and the passivation film mainly exhibited the characteristics of n-type semiconductor region; after the potentiostatic polarization of 0.6 V, the slopes of straight line segment of both the p-type and n-type semiconductor regions increased, but the increase in the p-type region was not obvious; after the potentiostatic polarizations of 0.8 V and 1.1 V, the slopes of onset stage were significantly increased in the p-type and n-type semiconductor regions. Overall, with the potentio-static polarization voltage increasing, the slope of straight line segment of the p-type semiconductor increased significantly and gradually. The slope of the straight line segment of the n-type semiconductor region also increased gradually.

Figure 5:
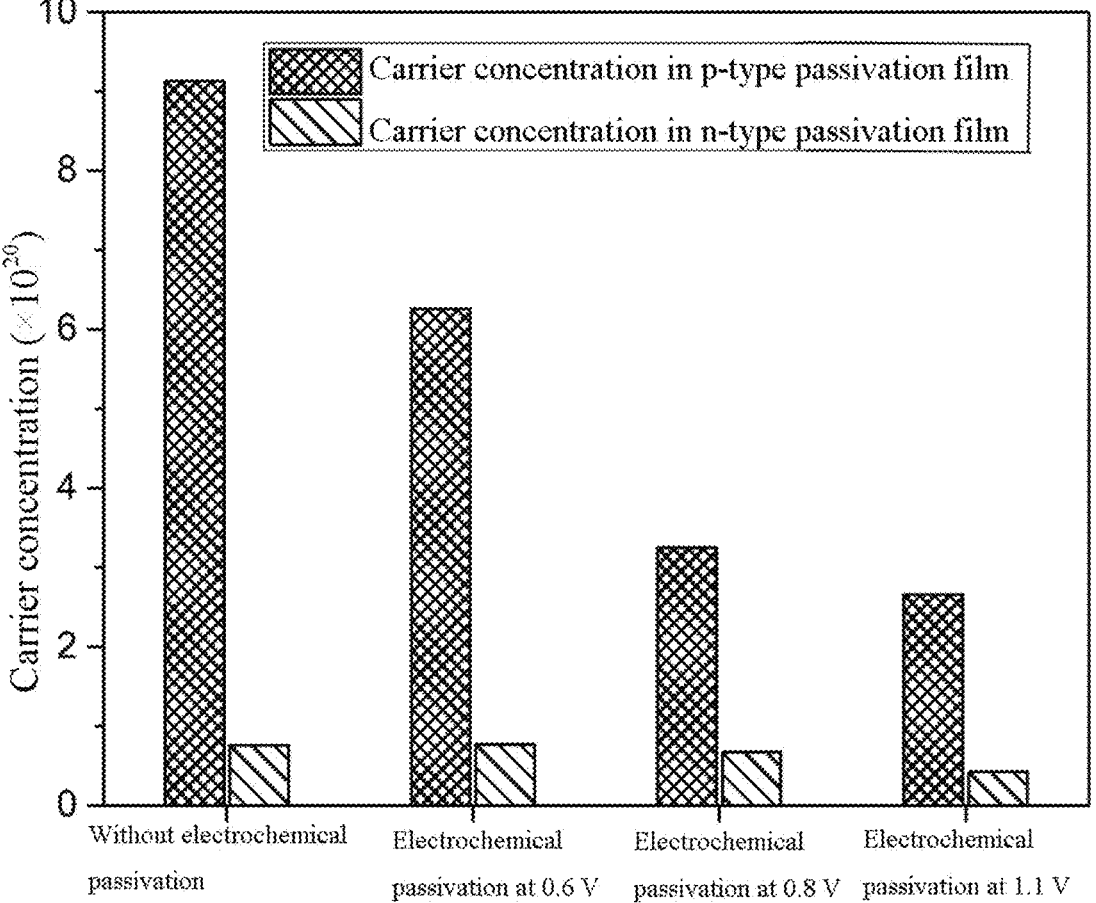
FIG. 5 is a graph showing carrier concentrations of p-type and n-type passivation films of a stainless steel in an example of the present application.

FIG. 5 is a graph showing M-S carrier concentrations of passivation films of the stainless steel in Example 1 (electrochemical passivation potential of 1.1 V), Example 25 (electrochemical passivation potential of 0.8 V), Example 29 (electrochemical passivation potential of 0.6 V) and Example 30 (no electrochemical passivation performed). It can be found from FIG. 5 that the passivation film formed after the electrochemical passivation on the sample surface had a gradually reduced carrier concentration in the p-type semiconductor region (nearly reducing by 4 times at 1.1 V compared with the sample without electrochemical passivation), and the reduction in carrier concentration showed an increase in the compactness of the passivation film, indicating that its protective performance became better. After electrochemical passivation, the carrier concentration in the n-type semiconductor region was reduced (reducing by less than 2 times at 1.1 V), which, on the one hand, indicated that the protection capability of the n-type semiconductor passivation film region was increased, and on the other hand, its conductivity was not significantly reduced. Therefore, overall, the passivation film could ensure the improvement of corrosion resistance without significantly increasing the contact resistance.

Meanwhile, it can be found from Table 4, FIG. 4 and FIG. 5 that the composition of the passivation film could be changed by adjusting the parameters of the electrochemical passivation treatment, and the performance of the passivation film could be optimized. For example, the characteristics of the passivation film could be controlled by applying different potentials in the electrochemical passivation treatment (see FIG. 4 and FIG. 5), in which as the potential increased, the thickness ratio $t_p/t_n$ of p-type semiconductor and n-type semiconductor in the passivation film gradually increased, thereby improving the service performance of stainless steel in fuel cell stacks. Accordingly, the composition of the passivation film could be changed by adjusting the above parameters of the electrochemical passivation treatment, and the performance of the passivation film could be optimized, finally improving the applicability of stainless steel bipolar plates applied to fuel cells.

Figure 6:
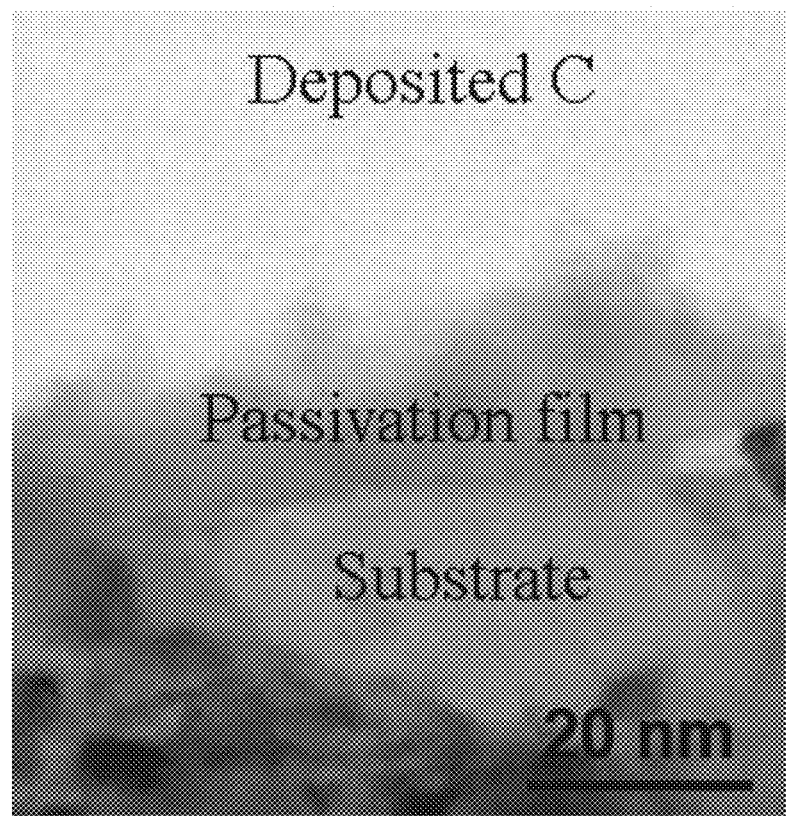
FIG. 6 is an image showing the cross section morphology of a stainless steel in an example of the present application.

The cross section morphology of the passivation film of the stainless steel in Example 1 was characterized. The specific characterization method included that: a transmission electron microscopy (TEM) was used to characterize the cross section of the sample cut by focused ion beam, so as to obtain the cross section morphology image of the passivation film (in order to protect the passivation film from being damaged during the sample preparation by focused ion beam sample, a carbon film was first deposited on the outermost layer), and the result is shown in FIG. 6. The highest part was the deposited C layer, the middle part was the passivation film, and the lowest part was the stainless steel substrate. It can be found from the image that the whole passivation film was continuous, compact and uniform, without obvious defects, and the thickness was about 12-20 vation treatment may be performed sequentially after the step (1).

In these examples, the roughness treatment conditions were that: under the room temperature (25° C.), the sample was polarized at 10 V for 50 s in a $H_2SO_4$ solution of 3 mol/L.

The chemical passivation treatment conditions were that: the steel sheet obtained after the roughness treatment described above was electrochemically passivated with an anode potential of 1.1 V for 1 h in a $HNO_3$ solution of 1.6 mol/L at 40° C.

TABLE 6

| Example | Steel No. | Roughness Treatment | Interface Contact Resistance ($m\Omega \cdot cm^2$) | Electrochemical Passivation Treatment | Interface Contact Resistance ($m\Omega \cdot cm^2$) | $t_p/t_n$ | $I_p/I_n$ | Interface Contact Resistance after running ($m\Omega \cdot cm^2$) | Corrosion Current Density ($\mu A \cdot cm^{-2}$) |
|---|---|---|---|---|---|---|---|---|---|
| 31 | 6 | Yes | 20 | Yes | 5 | 0.5 | 5.7 | 7.1 | 1.2 |
| 32 | 6 | Yes | 20 | No | 20 | 0.11 | 2.1 | 85 | 5.6 |
| 33 | 6 | No | 178 | No | 178 | 0.17 | 1.2 | 340 | 112.5 |
| 34 | 7 | Yes | 18 | Yes | 8 | 0.58 | 7 | 5.9 | 0.6 |
| 35 | 7 | Yes | 18 | No | 18 | 0.07 | 2.5 | 75 | 6.4 |
| 36 | 7 | No | 257 | No | 257 | 0.1 | 1.3 | 342 | 145.8 |
| 37 | 8 | Yes | 28 | Yes | 7 | 0.35 | 6.5 | 5.7 | 1.5 |
| 38 | 8 | Yes | 28 | No | 28 | 0.09 | 1.5 | 150 | 13.2 |
| 39 | 8 | No | 187 | No | 187 | 0.08 | 1.1 | 256 | 242.3 |
| 40 | 9 | Yes | 23 | Yes | 5 | 0.22 | 4.2 | 7.6 | 0.6 |
| 41 | 9 | Yes | 23 | No | 23 | 0.15 | 2.3 | 118 | 7.8 |
| 42 | 9 | No | 176 | No | 176 | 0.77 | 2.2 | 234 | 134.3 |
| 43 | 10 | Yes | 22 | Yes | 8 | 0.48 | 4.8 | 6.4 | 1.3 |
| 44 | 10 | Yes | 22 | No | 22 | 0.17 | 2.4 | 99 | 7.7 |
| 45 | 10 | No | 188 | No | 188 | 0.78 | 1.5 | 232 | 245.1 | nm. The outer layer of the passivation film was uneven, because the outermost passivation film underwent a dynamic growth-dissolution process in the acid solution, and the surface of the passivation film in the acid solution was usually uneven.

Examples 31-37

These examples differ from Example 1 in that: steel number, whether the steel was subjected to the surface roughness treatment and whether the steel was subjected to electrochemical passivation treatment, the results are shown in Table 6. Specifically, the surface roughness treatment may be directly performed after the step (1) without the electrochemical passivation treatment; or the electrochemical passivation treatment may also be directly performed after the step (1) without the surface roughness treatment; or the surface roughness treatment and the electrochemical passivation treatment may be performed sequentially after the step (1).

Examples 38-45

These examples differ from Example 1 in that: steel number, whether the steel was subjected to the surface roughness treatment and whether the steel was subjected to electrochemical passivation treatment, the results are shown in Table 6. Specifically, the surface roughness treatment may be directly performed after the step (1) without the electrochemical passivation treatment; or the electrochemical passivation treatment may also be directly performed after the step (1) without the surface roughness treatment; or the surface roughness treatment and the electrochemical passi- It can be found from Table 6 that the arrangement of the passivation film after the roughness treatment could further enhance the protection effect, increase the electrical conductivity, and further improve the performance.

Meanwhile, by sequentially subjecting the stainless steel to a roughness treatment and then an arrangement of passivation film, the passivation film on the stainless steel surface had good performance. The thickness ratio of p-type to n-type semiconductors was within 0.2-0.6, and $I_p[Cr(OH)_3/Cr_2O_3]/I_n[Cr(OH)_3/Cr_2O_3]$ was more than 4; and after running for a certain period of time, the interface contact resistance was less than 8 mΩ·cm², and the current density was less than 3 μA/cm², showing good performance. Additionally, for either the passivation film was not arranged after the roughness treatment or the passivation film was directly arranged without the roughness treatment, the performances of the surface passivation film were all greatly improved compared with the samples without the roughness treatment and the passivation film arrangement. The subsequent long-term service test also showed that the interface contact resistance and the current density were reduced for the passivation film.

The applicant has stated that although the detailed method of the present application is described through the examples described above, the present application is not limited to the detailed method described above, which means that the implementation of the present application does not necessarily depend on the detailed method described above. It should be apparent to those skilled in the art that any improvements made to the present application, equivalent substitutions of various raw materials of the product, the addition of adjuvant ingredients, and the selection of specific manners, etc. in the present application all fall within the protection scope and the disclosed scope of the present application.

What is claimed is:

1. A ferritic stainless steel used for bipolar plates of fuel cells, wherein based on that a mass of the ferritic stainless steel is 100%, the ferritic stainless steel comprises:

C less than or equal to 0.03 wt. %;

N less than or equal to 0.02 wt. %;

Si less than or equal to 0.4 wt. %;

Mn less than or equal to 0.5 wt. %;

Cr 16-23 wt. %;

Cu 0-2.0 wt. %;

Mo 1.8-2.5 wt. %;

Ni 0.2-2.0 wt. %;

Ti 0.1-0.5 wt. %;

Nb 0.005-0.5 wt. %;

P less than or equal to 0.02 wt. %;

S less than or equal to 0.02 wt. %; and a remainder composed of Fe and other unavoidable accompanying elements;

the ferritic stainless steel has a grain size number of 4-9;

wherein the ferritic stainless steel is provided with a passivation film on the surface, and the passivation film comprises a p-type passivation film and an n-type passivation film;

the p-type passivation film corresponds to a p-type semiconductor region, and the n-type passivation film corresponds to an n-type semiconductor region;

the p-type passivation film refers to a p-type semiconductor passivation film, and the n-type passivation film refers to an n-type semiconductor passivation film;

the p-type semiconductor passivation film has a higher content of hydroxides of Fe and Cr than a content of oxides of Fe and Cr, and the n-type semiconductor passivation film has a lower content of hydroxides of Fe and Cr than a content of oxides of Fe and Cr;

a molar ratio of chromium hydroxide to chromium oxide in the p-type passivation film is represented as $I_p[Cr(OH)_3/Cr_2O_3]$, and $I_p[Cr(OH)_3/Cr_2O_3]$ is at least 10;

a molar ratio of chromium hydroxide to chromium oxide in the n-type passivation film is represented as $I_n[Cr(OH)_3/Cr_2O_3]$, and $I_n[Cr(OH)_3/Cr_2O_3]$ is at most 10; and $I_p[Cr(OH)_3/Cr_2O_3]/I_n[Cr(OH)_3/Cr_2O_3]$ is more than 3.

2. The ferritic stainless steel used for bipolar plates of fuel cells according to claim 1, wherein the ferritic stainless steel has a grain size number of 6-8.

3. The ferritic stainless steel used for bipolar plates of fuel cells according to claim 1, wherein the ferritic stainless steel further comprises V of less than or equal to 0-1 wt. % and/or W of 0-1 wt. %.

4. The ferritic stainless steel used for bipolar plates of fuel cells according to claim 1, wherein the ferritic stainless steel further comprises a rare earth metal of 0.0002-1 wt. %.

5. The ferritic stainless steel used for bipolar plates of fuel cells according to claim 1, wherein a surface roughness of the ferritic stainless steel is within 100-700 nm, preferably 100-600 nm, and further preferably 200-500 nm.

6. The ferritic stainless steel used for bipolar plates of fuel cells according to claim 1, $I_p[Cr(OH)_3/Cr_2O_3]$ is at least 15;

preferably, $I_n[Cr(OH)_3/Cr_2O_3]$ is less than 5;

preferably, $I_p[Cr(OH)_3/Cr_2O_3]/I_n[Cr(OH)_3/Cr_2O_3]$ is more than or equal to 4.

7. The ferritic stainless steel used for bipolar plates of fuel cells according to claim 6, wherein a thickness of the passivation film is 5-20 nm, preferably 10-15 nm;

preferably, a thickness of the p-type passivation film is represented as $t_p$, a thickness of the n-type passivation film is represented as $t_n$, and $t_p/t_n$ is more than 0.2 but less than 0.6;

preferably, in the passivation film, an inner layer is the n-type passivation film, an outer layer is the p-type passivation film, and $t_p/t_n$ is more than 0.2 but less than 0.6.

8. A method of preparing bipolar plates of fuel cells, comprising: using the ferritic stainless steel according to claim 1.

* * * * *